United States Patent
Wen et al.

(10) Patent No.: US 8,022,858 B2
(45) Date of Patent: Sep. 20, 2011

(54) RADAR DETECTION METHOD AND APPARATUS USING THE SAME

(75) Inventors: Chun Hsien Wen, Hsinchu County (TW); Jiunn Tsair Chen, Hsinchu County (TW)

(73) Assignee: Ralink Technology Corporation, Hsinchu County (TW)

( * ) Notice: Subject to any disclaimer, the term of this patent is extended or adjusted under 35 U.S.C. 154(b) by 546 days.

(21) Appl. No.: 12/237,649

(22) Filed: Sep. 25, 2008

(65) Prior Publication Data

US 2010/0277362 A1    Nov. 4, 2010

(30) Foreign Application Priority Data

Mar. 17, 2008    (TW) ................. 97109284 A

(51) Int. Cl.
  *G01S 7/42*    (2006.01)
(52) U.S. Cl. ............................. 342/20; 342/13
(58) Field of Classification Search .............. 342/13–20
  See application file for complete search history.

(56) References Cited

U.S. PATENT DOCUMENTS

| | | | | |
|---|---|---|---|---|
| 5,451,956 A * | 9/1995 | Lochhead | ........................ | 342/13 |
| 5,856,803 A * | 1/1999 | Pevler | .............................. | 342/13 |
| 6,697,013 B2 * | 2/2004 | McFarland et al. | ........... | 342/159 |
| 7,034,738 B1 * | 4/2006 | Wang et al. | ..................... | 342/13 |
| 7,155,230 B2 * | 12/2006 | Tsien | ............................ | 455/450 |
| 7,336,736 B2 * | 2/2008 | Leblond et al. | ............... | 375/342 |
| 7,701,382 B2 * | 4/2010 | Hansen | ............................ | 342/52 |
| 2010/0277362 A1 * | 11/2010 | Wen et al. | ..................... | 342/159 |

OTHER PUBLICATIONS

Ma Wen, Luo Hanwen, "Radar Detection for 802.11a Systems in 5GHz Band", 2005 IEEE.

* cited by examiner

*Primary Examiner* — Thomas Tarcza
*Assistant Examiner* — Peter Bythrow
(74) *Attorney, Agent, or Firm* — WPAT, P.C.; Anthony King

(57) ABSTRACT

A method for detecting radar signal comprises the steps of: receiving a signal by a receiver, wherein the strength of the received signal is controlled within a range; sampling the received signal so as to obtain a plurality of sampling values; dividing the sampling values into a plurality of segments; summing up the absolute values of the sampling values in each segment; and determining that the received signal includes radar signals if at least one summation is greater than a threshold.

20 Claims, 6 Drawing Sheets

RADAR DETECTION METHOD AND APPARATUS USING THE SAME

BACKGROUND OF THE INVENTION

1. Field of the Invention

The present invention relates to a radar detection method and apparatus, and more particularly to a radar detection method capable of detecting radar signals during normal operations.

2. Description of the Related Art

There is a widespread development in wireless communication devices using unauthorized frequency. For example, the Federal Communications Commission (FCC) released 255 MHz bandwidth from 5.470 GHz to 5.725GHz in 2003for unlicensed national information infrastructure (U-NII). However, the signals of U-NII devices at about 5GHz are easily interfered with by existing radar signals. FIG. 1 shows a typical U-NII and radar system. The transmitting scope of a U-NII system 11, e.g., a wireless local area network 11 composed of a plurality of U-NII devices 15 and a wireless base station 14, is overlapped with that of radar systems 12, 13 so that their signals conflict with each other. To resolve such a matter, the FCC regulates that all U-NII devices using bandwidth between 5.25GHz and 5.35GHz and between 5.470, GHz and 5.725GHz have to adopt dynamic frequency selection (DFS) technology so as to hop frequency to a conflict-free channel when a frequency conflict occurs. Thus the conflict issue caused by radar signals around 5GHz is resolved.

While DFS solves the problem of frequency conflict, the issue of effectively implementing the detection of conflicting radar signals remains without solution. 802.11h, the specification defined by the Institute of Electrical and Electronics Engineers (IEEE), proposes that the radio local area network (RLAN) around 5GHz should not only adopt DFS technology to avoid conflict with radar signals and to uniformly allocate bandwidth, but also should suspend current signal transmission in order to detect radar signal to reduce possible signal interference. However, the above suggestion will largely decrease throughput of signal transmission and does not meet the user's demand.

M. Wen, L. Hanwen, "Radar detection for 802.11a systems in 5GHz band," International Conference on Wireless Communications, Networking and Mobile Computing, 2005,pp. 512-514presented an algorithm for detecting radar signals. The algorithm detects power variation whose position is close to sampling signals. However, it normally fails when RLAN and radar signals stay in the same power level.

U.S. Pat. No. 6,697,013discloses another algorithm of detecting radar signal, which achieves the detection based on signal correlation, pulse width and zero crossing. However, its hardware complexity is considerable because both real and imaginary parts of the frequency and time domains have to be compared.

SUMMARY OF THE INVENTION

The method for detecting radar signal in accordance with one embodiment of the present invention comprises the steps of: receiving a signal by a receiver, wherein the strength of the received signal is controlled within a range; sampling the received signal so as to obtain a plurality of sampling values; dividing the sampling values into a plurality of segments; summing up the absolute values of the sampling values in each segment; and determining that the received signal includes radar signals if at least one summation is greater than a threshold.

The method for detecting radar signal in accordance with another embodiment of the present invention comprises the steps of: receiving a signal by a receiver, wherein the strength of the received signal is controlled within a range; sampling the received signal so as to obtain a plurality of sampling values; dividing the sampling values into a plurality of segments; calculating a parameter in accordance with the sampling values in each segment; and determining that the received signal includes radar signals if at least one parameter is greater than a threshold.

The apparatus for detecting radar signal in accordance with one embodiment of the present invention comprises a first transceiver, a memory and a processor. The first transceiver is configured to receive a received signal, wherein the strength of the received signal is controlled within a range. The memory is configured to store the received signal. The processor is configured to segmentally capture the received signal stored in the memory and compare the received signal with a predetermined threshold so as to determine whether the received signal includes radar signal.

BRIEF DESCRIPTION OF THE DRAWINGS

The invention will be described according to the appended drawings in which.

PREFERRED EMBODIMENT OF THE PRESENT INVENTION

Figure 1:
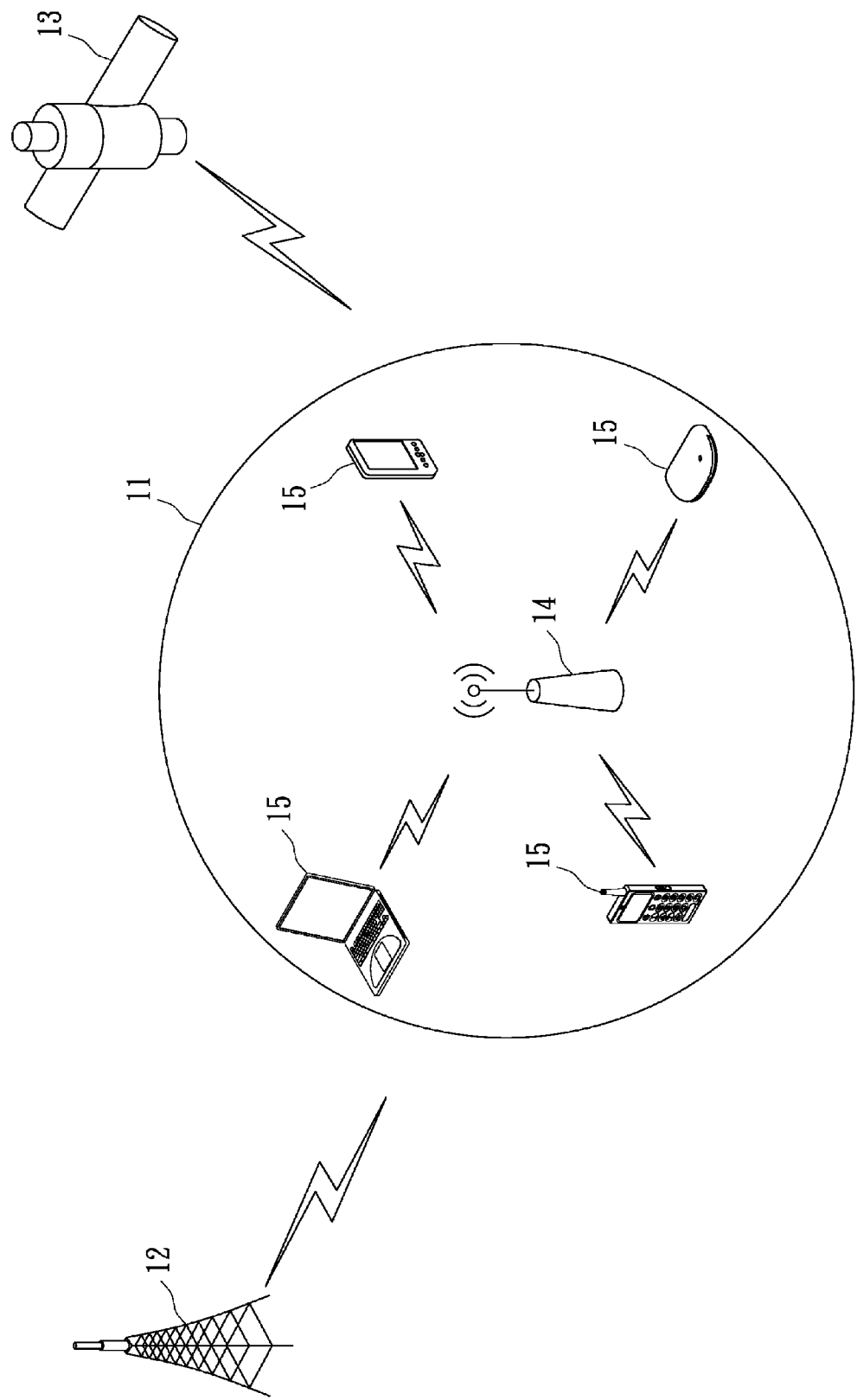
FIG. 1 shows a typical U-NII and radar system.
Figure 2:
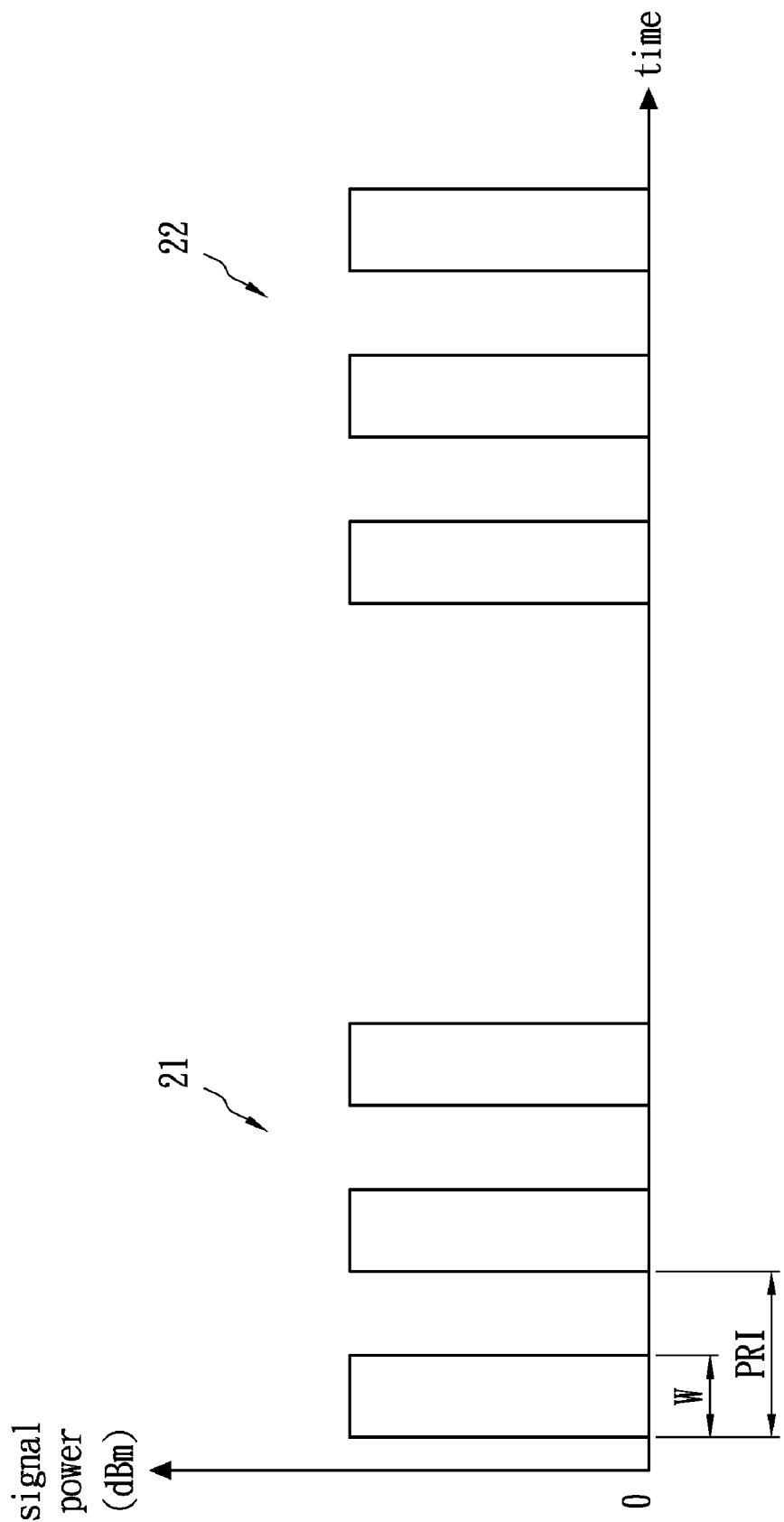
FIG. 2 shows characteristics of radar signals.

Generally, radar signals possess specific signal characteristics. As shown in FIG. 2, a radar signal possesses two series of bursts 21, 22, and each burst has the same interval width W and pulse repetition interval (PRI). The present invention uses the above characteristics to detect the existence of radar signals.

Figure 3:
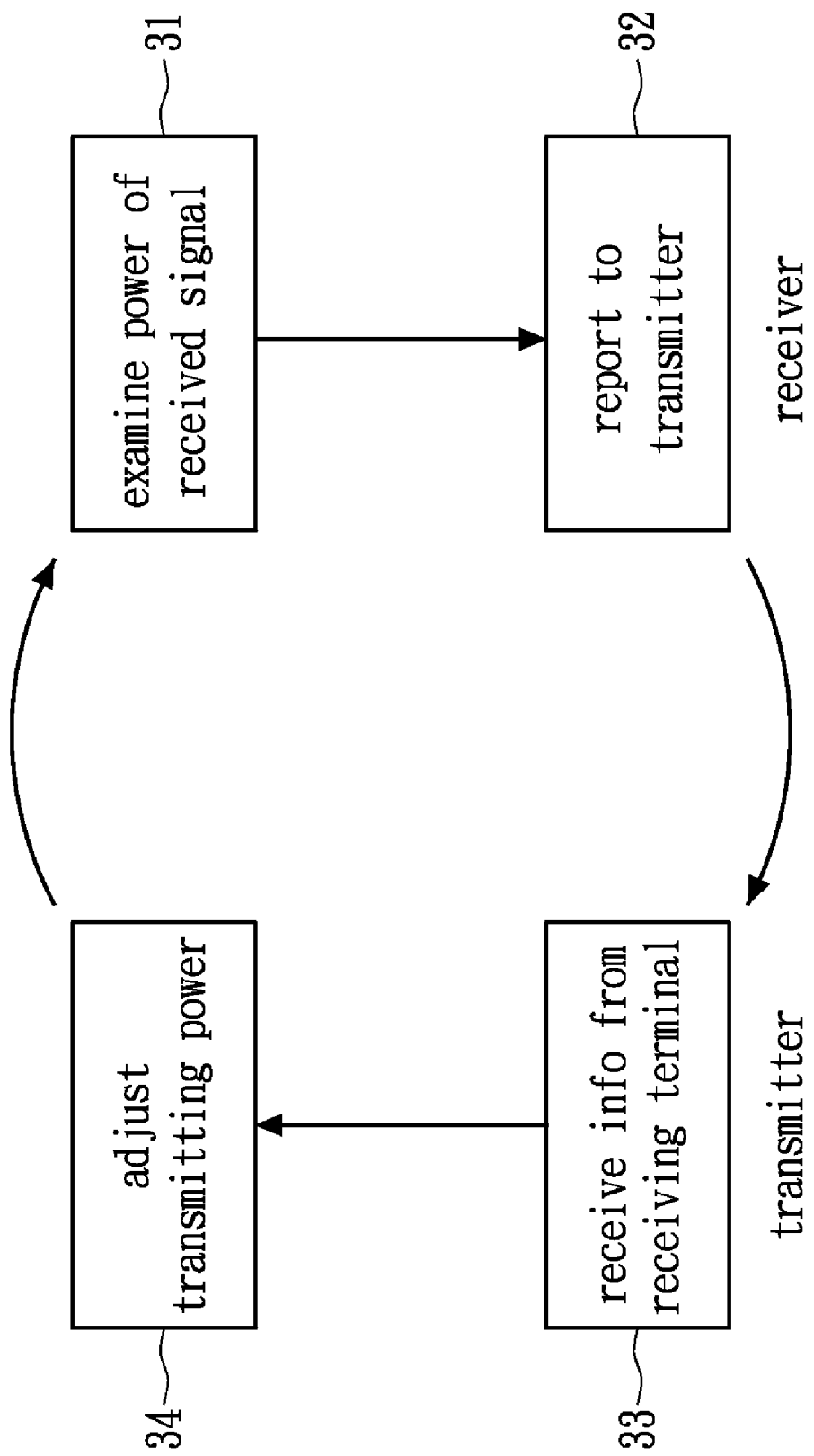
FIG. 3 shows a power-adjusting method.

Because the FCC only regulates that all wireless communication devices should be capable of detecting radar signals above −62dBm, the present invention sets the transmitting power under −65dBm, which reserves 3dBm noise margin so as to differentiate non-radar signal. FIG. 3 shows a power-adjusting method, wherein the transmitter and receiver continuously communicate in a feedback manner to control the transmitting power under a specific value. In step 31, the transmitter examines a received signal power first. In step 32, the transmitter reports the signal power to the transmitter. In step 33, the transmitter receives information from the receiver. In step 34, the transmitter adjusts the transmitting power to be under a specific value.

Figure 4:
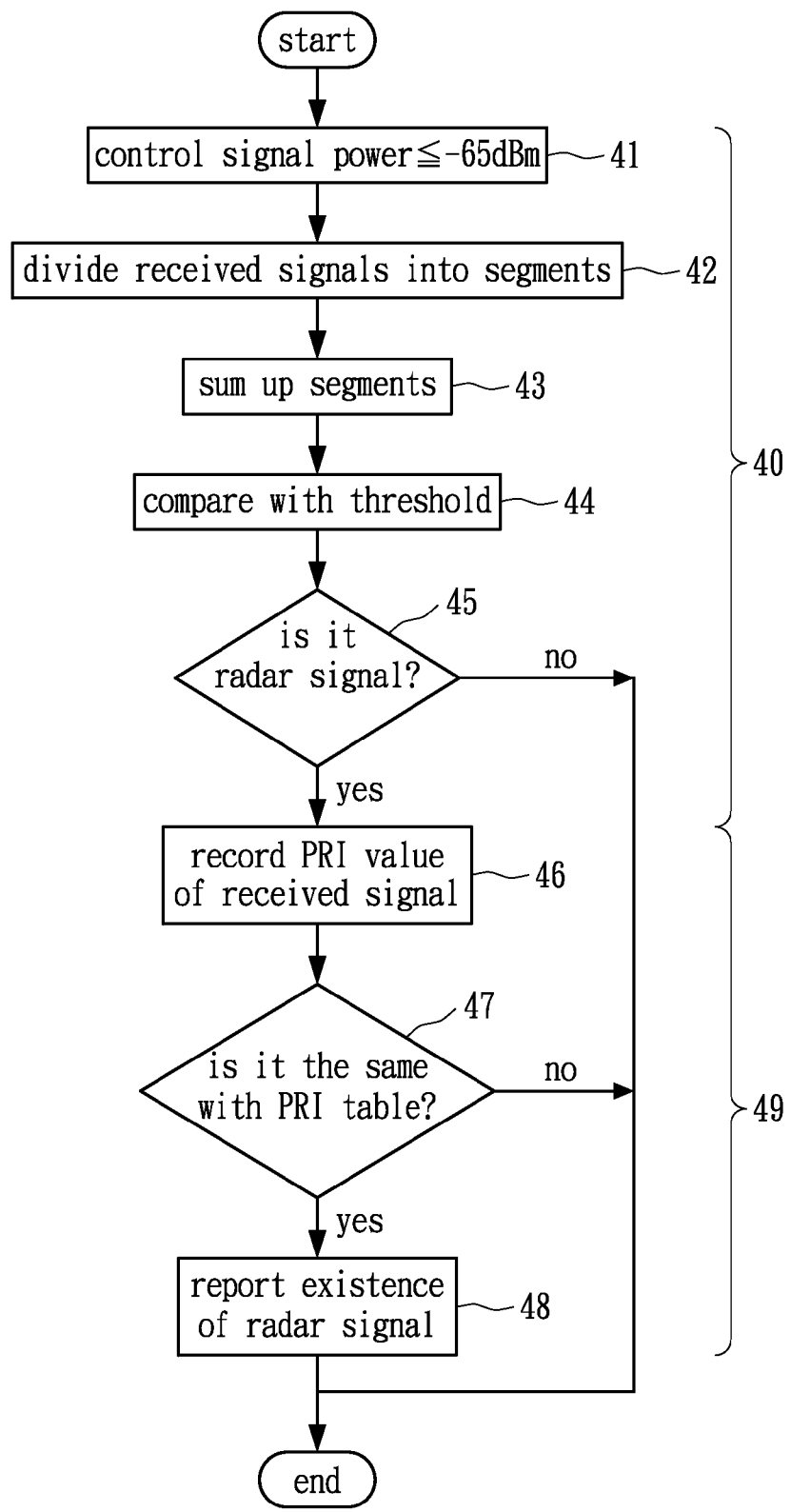
FIG. 4 shows a flow chart in accordance with one embodiment of the present invention.

FIG. 4 shows a flow chart in accordance with one embodiment of the present invention. This flow chart mainly includes a detection step 40 and a confirmation step 49. The confirmation step 49 is optional, and is used to detect erroneous output of the detection step 40. In step 41, the transmitting power is adjusted first so as to control the signal strength to approximately −65dBm. Because the FCC regulates that all wireless communication devices should be capable of detecting radar signals above −62dBm, this embodiment sets the transmitting power under −65dBm, which reserves 3dBm noise margin so as to differentiate non-radar signal. In step 42, the received signal is divided into segments. The segmentation is performed by directly dividing existing samples into different groups. In step 43, the absolute values of all samples in each segment are summed up. Alternatively, step 43 calculates a specific parameter such as mean or variance for all the samples in each segment instead of summation. However, using the summation method can reduce design complexity. In step 44, a threshold is set, and used to determine whether the received signal includes radar signals. In step 45, if it is determined that the received signal includes radar signal, then step 46 is performed, calculating and recording pulse interval (PRI) of the received signal. In step 47, the pulse interval is compared with an existing PRI table which includes pulse intervals corresponding to radar wave parameters, such as those regulated by the FCC or European Telecommunications Standards Institute (ETSI). If it is confirmed that the received signal includes radar signals, then step 48 is performed, reporting the message.

Figure 5:
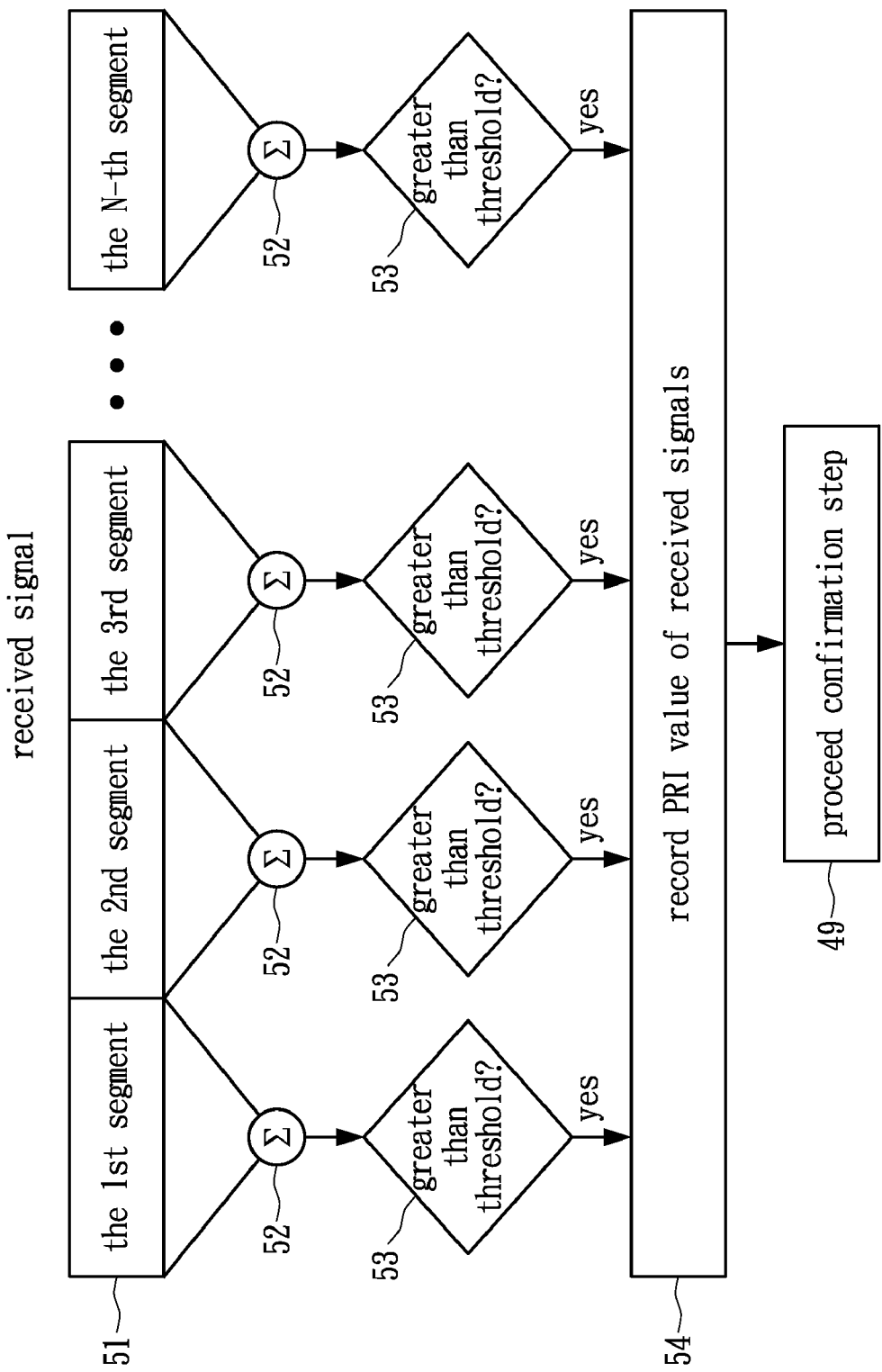
FIG. 5 further explains the flowchart of FIG. 4.

FIG. 5 further explains the flowchart of FIG. 4. First, the received signals are divided into groups 51 including the 1st segment, 2nd segment, . . . , and Nth segment, and samples in each group are summed up by an adder 52 or a processor. Subsequently, in step 53, it is determined whether the sum of each group is greater than a threshold value. If at least one segment satisfies the condition, then radar signals are determined to be existent in the surrounding circumstance. In step 54, the PRI value of the received value is recorded, and then the confirmation step 49 is performed.

Figure 6:
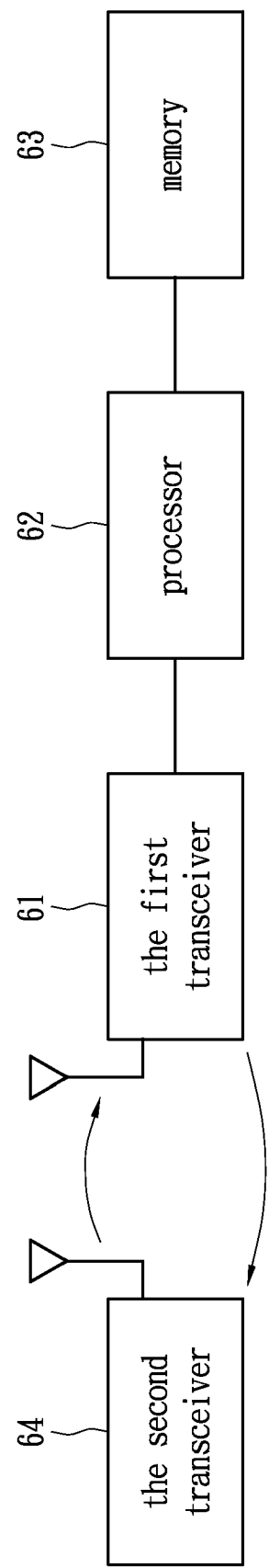
FIG. 6 shows a hint diagram of radar detection apparatus in accordance with one embodiment of the present invention.

FIG. 6 shows a hint diagram of radar detection apparatus in accordance with one embodiment of the present invention, which includes a first transceiver 61, a processor 62, a memory 63 and a second transceiver 64. The first transceiver 61 and the second transceiver 64 are configured to control the strength of the received signal to be less than or equal to a lowest regulated threshold of radar signal power. For example, if the FCC regulates that all wireless devices have to detect radar signals of over −62dBm, the strength of the received signal is set to be under −65dBm. The memory 63 is used to store received signal. The processor 62 is capable of capturing the received signal stored in the memory 63 in a segmentation manner, and compares it with a predetermined threshold value so as to primarily determine whether the received signal includes radar signals. The processor 62 further records when the received signal is received and then calculates a PRI value accordingly. The processor 62 will then compare the PRI value of the received signal with a PRI table having multiple pulse intervals mapped from a plurality of radar parameters. If it is confirmed that the PRI value of the received signal matches any value from the PRI table, then it is determined that the received signal includes radar signals.

In comparison with the prior art, the present invention need not stop transmitting signals upon detection of radar signals, and the throughput will not decrease. Under an interfering and high noise environment, the present invention can still detect the existence of radar signals. Furthermore, the present invention does not use any complex formula, and is easy to implement with software and hardware and thus applied in DFS technology.

The above-described embodiments of the present invention are intended to be illustrative only. Numerous alternative embodiments may be devised by persons skilled in the art without departing from the scope of the following claims.

What is claimed is:

1. A method for detecting radar signal, comprising:
    receiving a signal by a receiver, wherein the strength of the received signal is controlled within a range;
    sampling the received signal so as to obtain a plurality of sampling values;
    dividing the sampling values into a plurality of segments;
    summing up the absolute values of the sampling values in each segment; and
    determining that the received signal includes radar signal if at least one summation is greater than a threshold.

2. The method of claim 1, wherein the step of controlling the received signal to be within a range comprises:
    transmitting the received signal with a first power from a transmitter;
    receiving the received signal by the receiver and measuring the strength of the received signal;
    notifying the transmitter if the strength of the received signal is out of the range; and
    transmitting the received signal with a second power lower than the first power.

3. The method of claim 1, wherein the range is less than or equal to a lower threshold of radar power.

4. The method of claim 1, wherein the range is substantially equal to a lowest threshold of radar power minus 3dBm.

5. The method of claim 1, further comprising the step of examining intervals between pulses.

6. The method of claim 5, further comprising steps of:
    recording pulse intervals of the received signal; and
    comparing the pulse intervals of the signal with a pulse interval table so as to determine whether the received signal includes radar signals, wherein the pulse interval table includes pulse intervals corresponding to radar parameters.

7. The method of claim 6, wherein the pulse interval table includes radar parameters regulated by the United States Federal Communication Commission or the European Communication Standard Institute.

8. The method of claim 1, further comprising a step of applying a dynamic frequency selection to alter frequency if the received signal includes radar signal after the step of determining whether the received signal includes radar signals.

9. A method for detecting radar signal, comprising the steps of:
    receiving a signal, wherein the strength of the received signal is controlled within a range;
    sampling the received signal so as to obtain a plurality of sampling values;
    dividing the sampling values into a plurality of segments;
    calculating a parameter in accordance with the sampling values in each segment; and
    determining that the received signal includes radar signals if at least one parameter is greater than a threshold.

10. The method of claim 9, wherein the step of controlling the strength of the received signal to be within a range comprises:
    transmitting the received signal with a first power from a transmitter;
    receiving the received signal by the receiver and measuring the strength of the received signal;
    the receiver notifying the transmitter if the strength of the received signal is greater than the range; and
    the transmitter transmitting the received signal with a second power lower than the first power.

11. The method of claim 9, wherein the range is substantially equal to a lowest threshold of radar power minus 3dBm.

12. The method of claim 9, wherein the parameter is a mean or variance.

13. The method of claim 9, further comprising the step of examining intervals between pulses.

14. The method of claim 13, further comprising the steps of:
recording pulse intervals of the received signal; and
comparing the pulse intervals of the received signal with a pulse interval table so as to determine whether the received signal includes radar signals, wherein the pulse interval table includes pulse intervals corresponding to radar parameters.

15. The method of claim 9, further comprising a step of applying a dynamic frequency selection to alter frequency if the received signal includes radar signal after the step of determining whether the received signal includes radar signals.

16. An apparatus for radar signal detection, comprising:
a first transceiver configured to receive a received signal, wherein the strength of the received signal is within a range;
a memory configured to store the received signal; and
a processor configured to segmentally capture the received signal stored in the memory and compare the received signal with a predetermined threshold so as to determine whether the received signal includes radar signal.

17. The apparatus of claim 16, wherein the processor sums up the plurality of samples in each segment respectively, and compares the sum with the predetermined threshold.

18. The apparatus of claim 16, wherein the processor calculates mean and variance of the samples in each segment, and compares the mean and variance with the predetermined threshold.

19. The apparatus of claim 16, wherein the processor further records pulse intervals of the received signal and compares the pulse intervals with a pulse interval table accordingly.

20. The apparatus of claim 16, further comprising a second transceiver for transmitting the received signal, wherein the second transceiver adjusts the strength of the received signal in response to feedback information from the first transceiver.

* * * * *